C. PEARSON.
PITMAN CONNECTION.
APPLICATION FILED JUNE 19, 1911.

1,205,254.

Patented Nov. 21, 1916.

Witnesses:
E. C. Palmer.
F. W. Hofmeister.

Inventor.
Charles Pearson.
By E. W. Burgess
Attorney.

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

PITMAN CONNECTION.

1,205,254.　　　　Specification of Letters Patent.　　Patented Nov. 21, 1916.

Application filed June 19, 1911. Serial No. 634,009.

*To all whom it may concern:*

Be it known that I, CHARLES PEARSON, a citizen of the United States, residing at Chicago, in the county of Cook and State of Illinois, have invented certain new and useful Improvements in Pitman Connections, of which the following is a specification.

My invention relates to pitman connections, in which the pitman is connected to the driving or driven part of the mechanism by means whereby a loosening of the connected parts, due to the wearing away of their contacting surfaces, is automatically prevented; the object of my invention being to provide an improved automatically operative take-up device that is simple in construction, efficient in operation and easily released when it is desired to adjust the parts of the associated mechanism. I attain these objects by means of mechanism, one embodiment of which is illustrated in the accompanying drawings, in which—

Figure 1:
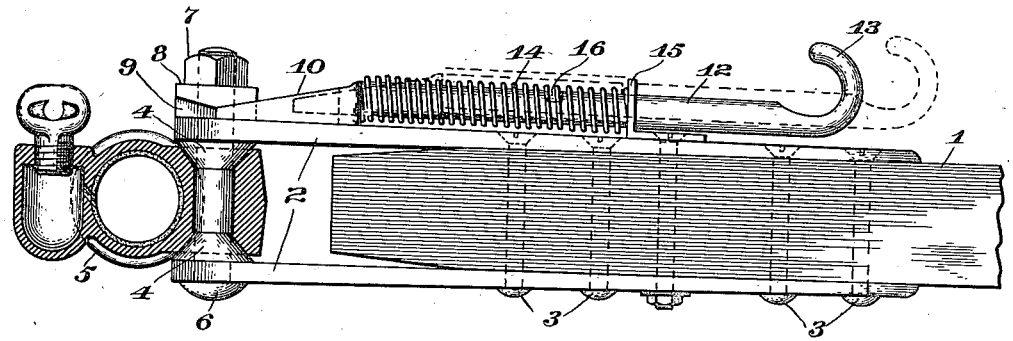
Figure 2:
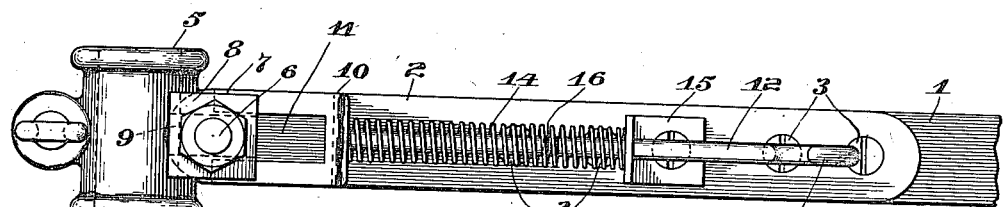
Figure 3:
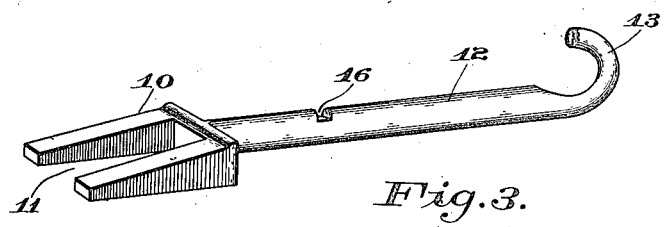
Figure 4:
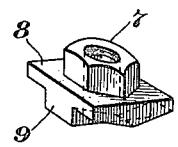

Figure 1 represents a side elevation of part of a pitman designed to be used in connection with the cutting apparatus of a mowing machine, and showing a cross section of the bearing box that receives the crank pin of the machine, the flexible jaws of the pitman being held in engagement with the box by my improved mechanism; Fig. 2 is a top plan view of Fig. 1; Fig. 3 is a detail of the take-up mechanism shown in perspective; and Fig. 4 is a view in perspective of a special form of nut forming part of the take-up mechanism.

The same reference characters designate like parts throughout the several views.

1 represents part of the body of a pitman, which is preferably made of wood, and 2 flexible or spring jaws secured to opposite sides of the pitman by means of rivets 3, the jaws being provided at their outer ends with inwardly projecting conical bearing portions 4 that are received by tapering cavities upon opposite sides of the bearing block 5 that is adapted to receive the crank pin of a driving element in a common way.

The conical bearings are provided with axial openings that pass through the jaws, and a clamping bolt 6 passes through the openings and an alined opening through the bearing block, and 7 represents a nut having a rectangular flange 8 and a central rib portion 9 extending downward from the flange, the surface of the flange outside of the rib portion being inclined upward from a diametrical line toward the opposite edges of the flange in a manner to receive a wedge-shaped key 10 that is provided with a centrally arranged slotted opening 11 adapted to receive the rib portion 9 of the nut. The key is provided with a shank portion 12 that terminates in a curved finger piece 13, and 14 represents a coiled spring surrounding the shank and operative between a clip 15 secured to the pitman, and that slidably receives the shank, and the head of the key in a manner to press the key in engagement with the inclined surfaces of the flange and thereby take up any wear upon the conical bearings and cavities that receive them by causing the jaws to approach each other.

When it is desired to release the jaws from their connection with the bearing box the key is withdrawn against the force of the spring until a notch 16 upon the surface of the shank portion thereof is permitted to engage with the wall of the opening in the clip 15 in a manner to retain the key in a retracted position, as shown by dotted lines in Fig. 1. When the key is retracted the nut may be removed from the bolt and adjusted thereon as desired until the rib portion thereof coincides with the slotted opening in the key, when the latter may be released and permitted to engage with the inclined surfaces upon the flange of the nut in a manner to yieldingly press the pitman jaws in contact with the bearing box and with the rib portion in a manner to lock the nut against a turning movement upon the bolt.

While I have in this application specifically described one embodiment of my invention, it is to be understood that the same is used for purposes of illustration and that the invention itself may be modified without departing from its spirit.

What I claim as my invention, and desire to secure by Letters Patent, is:

1. In a pitman connection, a pitman, a bolt protruding therefrom, a spring pressed wedge member carried on said pitman and disposed at one side of said bolt, and means having an inclined surface engageable with the surface of said wedge member and adjustable with respect to said bolt.

2. In a pitman connection, a pitman, spring jaws protruding therefrom, a bolt carried by one of said jaws and protruding through the other, a spring-pressed slotted wedge member carried by said pitman and receiving said bolt in the slot therein, and means having an inclined surface engageable with the surface of said wedge member and adjustable longitudinally of said bolt.

3. In a pitman connection, a pitman, having spaced spring jaws projecting from one end thereof, a bearing block between said jaws, a bolt extending through said jaws and bearing block, conical members on said bolt seated in recesses in said block between said jaws, a spring pressed wedge carried on said pitman, and means having an inclined surface engageable with the surface of said wedge and adjustable longitudinally of said bolt.

4. In a pitman connection, a pitman, a bolt protruding therefrom, a nut carried on one end of said bolt having an inclined face adjacent the surface of said pitman, and a wedge member carried by said pitman and movable longitudinally thereof between said nut and said pitman, said wedge having an inclined face engaging the inclined face of said nut.

5. In a pitman connection, a pitman, a bolt protruding therefrom, a nut carried on one end of said bolt having a plurality of inclined faces disposed in intersecting planes on each side of the bolt and adjacent the surface of said pitman, and a wedge member carried by said pitman and movable longitudinally thereof between certain of the inclined faces on said nut and the surface of said pitman.

6. In a pitman connection, a pitman, a plurality of spring jaws thereon, a bearing block between said jaws, a bolt extending through said block and jaws, a nut on one end of said bolt, and a spring-pressed wedge carried on said pitman having an inclined portion, said wedge resting on one of said jaws and extending on one side of said bolt, said nut comprising a coöperating holding surface disposed between said nut and the inclined face of said wedge and having an inclined portion engaging with the inclined face of the wedge.

7. In a pitman connection, a pitman, a plurality of spring jaws thereon, a bearing block between said jaws, a bolt extending through said block and jaws, a nut carried on said bolt, and a spring-pressed wedge carried on said pitman movable longitudinally thereof and having parallel arms extending on opposite sides of said bolt, said nut comprising a coöperating holding surface interposed between said nut and the inclined faces of said arms and having an inclined portion engaging with the inclined faces of the wedge.

8. A pitman connection including, in combination, a pitman, a bearing block, flexible jaws secured to opposite sides of said pitman and adapted to operatively engage with said bearing block when said jaws are pressed toward each other, means for pressing said jaws toward each other, said means including a bolt received by openings in said bearing block and jaws and provided with a nut, said nut having a flange upon its inner end, the inner surface of said flange having a diametrically arranged rib thereon and inclined portions upon opposite sides of said rib, and a spring-pressed sliding key having an open-ended slot therein that receives said rib, said key being operative as a wedge between one of said jaws and the inclined portions of said flanged nut in a manner to cause said jaws to approach each other.

9. A pitman connection including, in combination, a pitman, a bearing block, flexible jaws secured to opposite sides of said pitman and adapted to operatively engage with said bearing block when said jaws are pressed toward each other, means for pressing said jaws toward each other, said means including a bolt received by openings in said bearing block and jaws and provided with a nut, the inner surface of said nut being provided with a diametrically-arranged rib and oppositely-disposed inclined surfaces upon opposite sides of said rib, a sliding key having an open-ended slot therein adapted to receive said rib, said key having a shank portion, a clip secured to said pitman, having an opening therein that receives said shank in a slidable manner, a spring encircling said shank and operative between said clip and the head of said key in a manner to cause said key to engage with the inclined surface of said nut in a manner to cause said jaws to approach each other.

10. A pitman connection including, in combination, a pitman, a bearing block, flexible jaws secured to opposite sides of said pitman and adapted to operatively engage with said bearing block when said jaws are pressed toward each other, means for pressing said jaws toward each other, said means including a bolt received by openings in said bearing block and jaws and provided with a nut, the inner surface of said nut being provided with a diametrically-arranged rib and oppositely-disposed inclined surfaces upon opposite sides of said rib, a sliding key having an open-ended slot therein adapted to receive said rib, said key having a shank portion, a clip secured to said pitman, having an opening therein that receives said shank in a slidable manner, a spring encircling said shank and operative between said clip and the head of said key in a manner to cause said key to engage with the inclined surfaces of said nut in a manner to cause said jaws to approach each other, said shank having a notch therein adapted to engage with said clip in a manner to retain said key in a retracted position.

CHARLES PEARSON.

Witnesses:
 RAY PATTISON,
 FRANK A. ZABILKA.